United States Patent [19]
Whitehouse

[11] 3,795,853
[45] Mar. 5, 1974

[54] SERVOMECHANISMS THAT DECELERATES PROPERLY ON APPROACH TO LIMIT OF TRAVEL

[75] Inventor: Joseph Colin Whitehouse, Blaby, England

[73] Assignee: The Rank Organisation Limited, London, England

[22] Filed: Dec. 27, 1971

[21] Appl. No.: 212,322

[30] Foreign Application Priority Data
Feb. 18, 1971   Great Britain...................... 4959/71

[52] U.S. Cl. ................................ 318/618, 318/626
[51] Int. Cl. ............................................. G05g 5/00
[58] Field of Search .... 318/618, 619, 624, 626, 635

[56] References Cited
UNITED STATES PATENTS
3,633,088   1/1972   Kupersmith......................... 318/626
3,122,687   2/1964   Romvari ............................. 318/618
3,209,338   9/1965   Romvari ......................... 318/561 X
3,241,015   3/1966   Allen ............................... 318/561 X
3,412,300   11/1968  Westenskow........................ 318/561

Primary Examiner—B. Dobeck
Attorney, Agent, or Firm—Brisebois & Kruger

[57] ABSTRACT

In a velocity-controlled servomechanism having also a position sensor such as a potentiometer, the invention provides an input circuit responsive to the reaching of a predetermined position for applying a fixed voltage source as the input to the velocity servo to cause the servo actuator to decelerate, suitably as it approaches the limits of its travel.

4 Claims, 4 Drawing Figures

SERVOMECHANISMS THAT DECELERATES PROPERLY ON APPROACH TO LIMIT OF TRAVEL

The invention relates to velocity-controlled servomechanisms, and particularly to servomechanisms for moving a load between limiting stops.

In such mechanisms the servo motor has a speed or acceleration output and the problem therefore arises of retarding the load sufficiently to prevent damage to the system at the end stops. This is important, for example, in a camera system where zoom elements are required to be driven at a high speed under accurate control. British Pat. specification No. 1,080,591 describes one sych system.

An object of the present invention is to provide a velocity-controlled servo mechanism having improved control in the region of the end stops.

A further object is to achieve this using non-critical components and to allow the load to be reversed off the end stops at full speed if required.

The invention consists in a servomechanism having an input circuit including an amplifier for delivering voltage to the input of a servo motor system for moving a load through a path limited by end stops, the servomechanism also including means for reducing the servo output speed at a critical position before an end stop, said means including a load position sensor and voltage limiting means inserted in said input circuit and responsive to signals delivered by the position sensor, said voltage limiting means being effective to reduce the voltage applied to said servo motor system to a preset maximum level at the critical position.

An embodiment of the invention will now be described in more detail with reference to the accompanying drawings in which.

Figure 1:
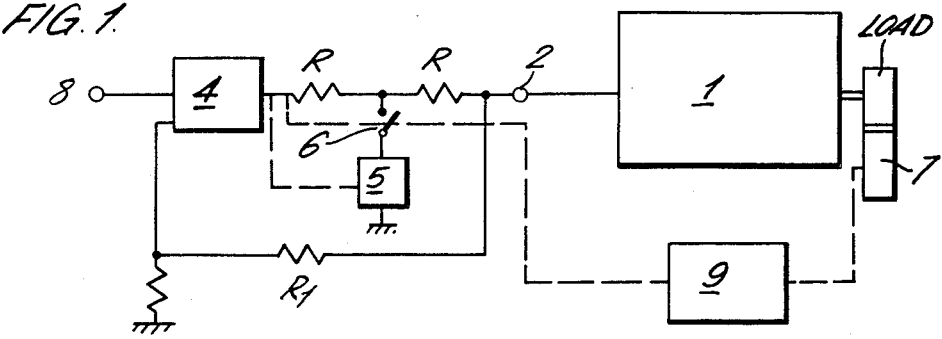
FIG. 1 is a block schematic diagram illustrating the essential components of a servo mechanism.

Referring now to FIG. 1, the load is driven by a velocity servo system 1, which may comprise an amplifier, a servo motor (which expression however also includes any type of actuator), and a feedback element (usually a tachogenerator).

The servomechanism includes an input circuit 3 placed in series with the input 2 to the velocity servo system 1 and effective to modify the input to the servo when the end stops are approached. The demand signal applied at 8 is passed through the circuit 3 incorporating an amplifier 4 and reference voltage source 5 in series with switch 6. Voltage source 5 and switch 6 are contained within the feedback loop of the amplifier 4.

Signals from a position sensor 7 are passed to a circuit 9, comprising an attenuator and/or amplifier (and if necessary incorporating D.C. level shifts) and are fed into the circuit 3. Circuit 9 also contains adjusting means designed to condition the response of switch 6 in the required manner to the position transducer 7. The position transducer is for example a potentiometer coupled to the load that is driven by the servo system 1.

Switch 6 is shown to be dependent both on the output of circuit 9 and on the output of amplifier 4, whilst the voltage source is also related to the output of the amplifier 4 in a way which will be further explained.

It will be seen that the voltage source 5 and switch 6 are positioned in the feedback path of amplifier 4, in particular are connected in parallel with the output of the amplifier 4 via a resistor and taken to earth or a similar reference point, and that the reference voltage source 5 is not effective until switch 6 is closed. Switch 6 is arranged to close when the end stops are neared as monitored by the position transducer 7 provided the demand input 8 is of the correct polarity.

Voltage source 5 may be arranged to have a preset value, say V, when the output voltage of amplifier 4 is greater than this value V and to reduce to a value substantially equal to the output voltage of amplifier 4 when this becomes less than V. When the voltage at the amplifier 4 drops below a certain value V' V switch 6 opens.

When switch 6 is closed the output of circuit 3 is substantially held at the preset maximum reference voltage V until the amplifier 4 output reduces below V. The output of circuit 3 then smoothly reduces to zero as the amplifier output substantially reduces to zero. The output speed of the velocity servo 1 will therefore be reduced to a speed corresponding to V until the output of amplifier 4 reduces below V, after which the servo output will then have a speed corresponding to this lower output voltage.

The action of the servo mechanism is explained as follows in a system limited at the extremes of the range by end stops.

When the velocity servo 1 is in the middle of its range the position transducer 7 will give a signal midway between its extreme values. This signal is arranged to feed into network 9, which may include a buffer and attenuation networks whose output feeds an input of switch 6. In this mid position and substantially over the whole range of movement of the servo excursion, apart from a critical part of the path beginning near the end stops, this signal will hold the switch 6 open. With switch 6 in the open condition the input voltage applied to the servo at 2 will correspond to the demand voltage at 8. This is because amplifier 4 is arranged to have a high open loop gain and the feedback resistors R and R1 of network 3 in the loop to the input of amplifier 4 are arranged to provide overall negative feedback with a forward gain of unity or some other low value such as one-half or two. Thus with the switch 6 open the velocity of the servo will correspond to the demand signal at 8, the correspondence being, of course, dependent upon the overall gain of circuit 3 as set by the feedback resistors.

Considering the situation as the servo nears an end stop, at some preset critical position, and therefore at some known value of signal taken off the position transducer 7, the switch 6 will close if the output of the amplifier 4 and hence the demand input at 8 is of the correct polarity; this position being, in part, determined by the setting of circuit 9, and the servo will revert to a lower speed corresponding to voltage V of the voltage source 5. The voltage V is of such level as to slow the servo speed down to avoid damage and noise generation as the servo approaches, and possibly strikes, the end stops. On reversing the polarity of the demand voltage at 8, the switch 6 will open and allow the servo to be driven off the end stops at full speed if required.

Switch 6 will now remain open whilst the servo travels through the safe range and will slow down before reaching the other end stop in a similar manner as explained above. Obviously circuit 9 can be adjusted so that the position at which switch 6 closes can be varied to suit any specific requirement.

As already mentioned, with switch 6 closed the output of circuit 3 is held at V (provided the output of amplifier 4 is greater than V) and therefore the feedback components do not fix the overall gain of the circuit 3. However, when the voltage of the amplifier falls below V' V the voltage control predominates over that of circuit 9 and switch 6 will drop out no matter what value of signal is coming from circuit 9.

Figure 2:
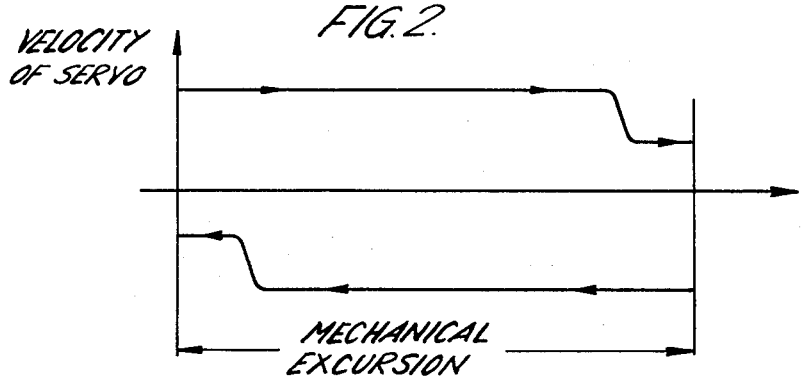
FIG. 2 is a vector diagram illustrating the desired conditions in a velocity servo with end stops.
Figure 3:
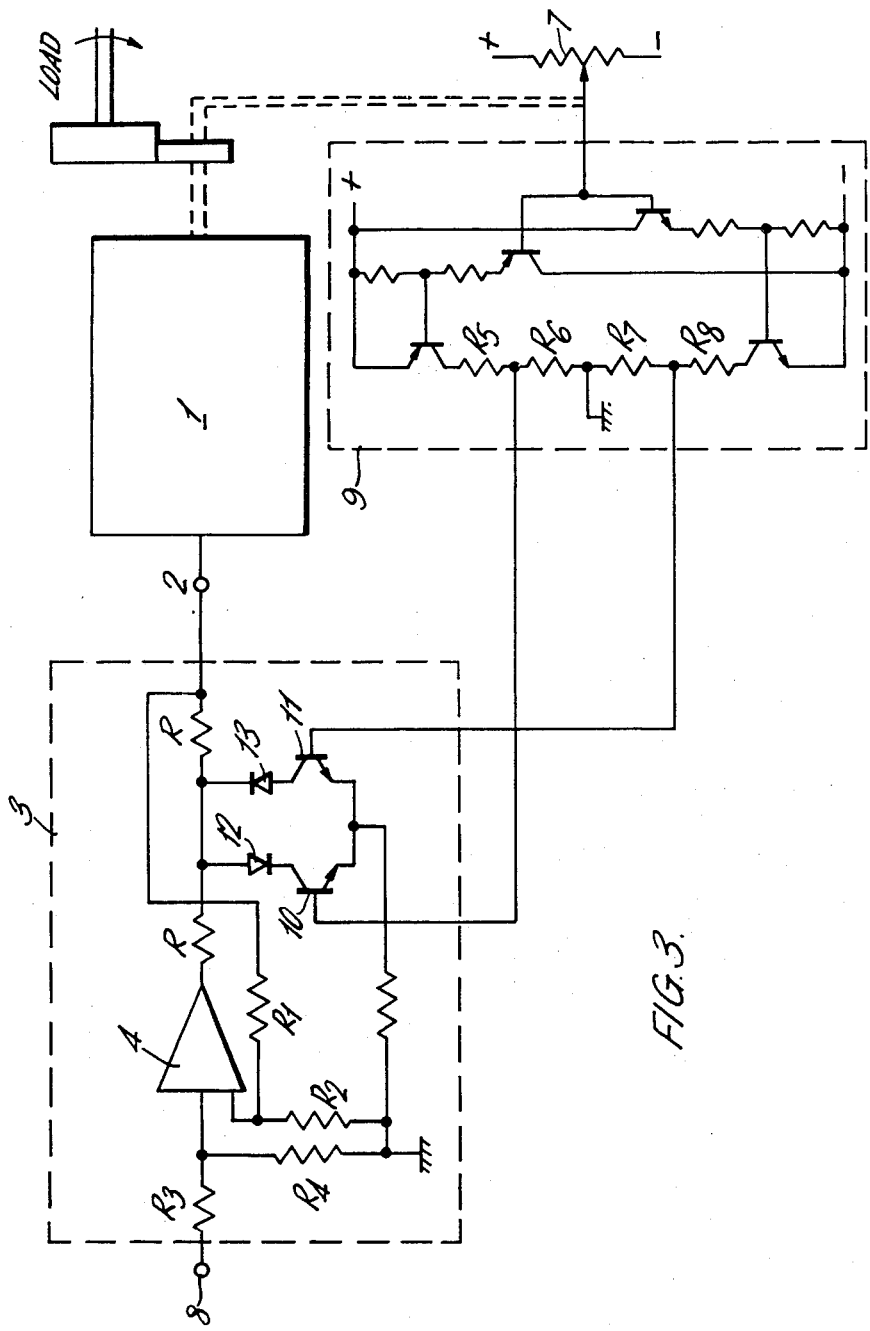
FIG. 3 is a circuit schematic diagram of a servo mechanism based upon FIG. 1.

A circuit schematic of a particular embodiment of the servomechanism is shown in FIG. 3, which gives a speed versus position curve substantially as shown in FIG. 2.

In this embodiment the switch 6 and the voltage source 5 are incorporated in a single pair of transistors 10 and 11 connected in parallel between the output of amplifier 4 and earth. In this parallel connection the collectors are connected together and to the amplifier output through two oppositely poled diodes 12 and 13 whilst the emitters share a common resistor 14. This resistor is usually small in value (of the order of a few tens of ohms). The bases of the transistors are connected to attenuator chain R5, R6, R7, R8 formed within circuit 9.

Arranged this way the transistor 10 will switch on when suitably biased by voltages on its collector derived from the output of amplifier 4 and on the base derived from circuit 9. These voltages are so derived that transistor 10 cannot be switched on at the same time as transistor 11 and vice versa. By choice of resistors in the attenuator chain of circuit 9 the transistors can be made to switch on at any chosen critical point near the end of the servo excursion. Voltage source 5 is simulated by the transistors when they are switched hard on and are saturated, plus the volts drops across the diodes and emitter resistor 14.

Circuit 9 is substantially acting as a combined buffer circuit and a voltage shift circuit, a further attenuation being effected with either R5 and R6 for transistor 10 and R7 and R8 for transistor 11.

The FIG. 3 shows only one configuration of the invention. A further simplification of the circuit to give adequate stopping could be achieved by possible elimination of the buffer circuit 9 and by feeding an attenuated signal from the transducer 7 direct to the transistors 10 and 11.

Figure 4:
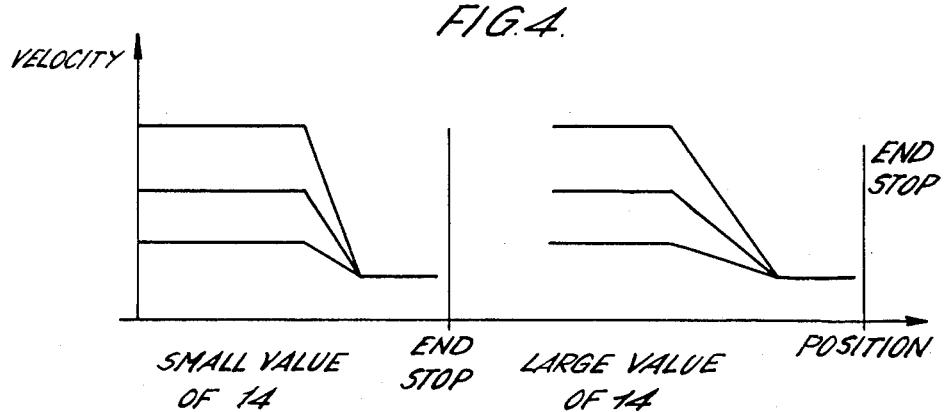
FIG. 4 shows a comparison between the switching effects obtained with different component values in the voltage limiting means of FIG. 3.

Emitter resistor 14 has the effect of altering the severity of the switching on and off of the transistors. FIG. 4 shows the effect on the speed of the servo as it reaches the transistor "switch-on" point with differing values of resistor 14.

An important advantage of the servo system above described is that by locating the switch 6 and voltage source 5 within the feedback loop of the amplifier 4 the effect of drift in respect of leakage and offset currents in switch 6 when in an open condition, that would normally manifest themselves as a change in the correspondence of voltage between 8 and 2, will be reduced by a substantial amount, approximately equal to the open loop gain of the circuit 3. This means that the switch 6 and voltage source 5 do not have to have a particularly low level of drift current to produce a satisfactory operation.

The above description of the invention refers to a position sensor in the form of a transducer. This generally will be a potentiometer, but could be a resolver.

The velocity servo motor system mentioned in the description, and comprising of amplifier, actuator (which is usually a motor) and feedback element (usually a tachometer generator), can of course be A.C. or D.C. The underlying principle of the invention could also be applied to an A.C. carrier system.

I claim:

1. A servomechanism having an input circuit including an amplifier for delivering voltage to the input of a servo motor system for moving a load through a path limited by end stops, the servomechanism also including means for reducing the servo output speed at a critical position before an end stop, said means including a load position sensor, and voltage limiting means inserted in said input circuit responsive to signals delivered by the position sensor, said voltage limiting means comprising a pair of transistors each connected in parallel to the amplifier at one side through a common emitter resistor, and at the other side through respective oppositely poled diodes, said transistors being arranged to receive base biasing voltages which are derived under the control of the position sensor, and collector biasing voltages which are derived through the respective diodes from the amplifier output such that said transistors are switched on and off at required different times in the load traversal.

2. A servomechanism having an input circuit including an amplifier for delivering voltage to the input of a servo motor system for moving a load through a path limited by end stops, the servomechanism also including means for reducing the servo output speed at a critical position before an end stop, said means including a load position sensor, and voltage limiting means inserted in said input circuit including a reference voltage source in combination with electronic switching means arranged within the feedback loop of the amplifier and under the control of the position sensor and of the amplifier output, said voltage limiting means comprising a pair of transistors each connected in parallel to the amplifier at one side through a common emitter resistor, and at the other side through respective oppositely poled diodes, said transistors being so biased by voltages derived from the amplifier output and by potentials under the control of the position sensor that said transistors are switched on and off at required different times in the load traversal, said reference voltage source being constituted by the sum of the series voltages across the respective transistor when turned of and saturated, the respective diode and the common resistor.

3. A servomechanism comprising
   (a) a velocity feedback servosystem for moving a load through a path limited by end stops in response to a velocity demand signal applied at an input to said servosystem;
   (b) an input circuit including an amplifier for receiving a signal representing a load velocity selected by an operator and for delivering said velocity demand signal to said input of the servosystem; and
   (c) means for reducing the speed of the load at a critical position before an end stop, said means including a load position sensor and voltage limiting means connected to said input circuit at the output of the amplifier and responsive to signals delivered by the load position sensor to reduce the said velocity demand signal at the input to the servosystem to a preset maximum level when the load reaches said critical position, and thereby reduce the speed of the load to a preset value as the load approaches said stop from said critical position.

4. A servomechanism according to claim 3, wherein the transistors are arranged in a feedback loop of the amplifier with a common emitter connection to said common resistor.

* * * * *